(12) United States Patent
Hagmeier et al.

(10) Patent No.: US 6,606,528 B1
(45) Date of Patent: Aug. 12, 2003

(54) METHOD FOR CREATING COMPUTER-AIDED DESIGN (CAD) SOLID MODELS FROM NUMERICALLY CONTROLLED (NC) MACHINE INSTRUCTIONS

(75) Inventors: Shawn E. Hagmeier, St. Peters, MO (US); Matthew T. Huffman, St. Peters, MO (US); Luis A. Vinuelas, Issaquah, WA (US)

(73) Assignee: The Boeing Company, Seattle, WA (US)

( * ) Notice: Subject to any disclaimer, the term of this patent is extended or adjusted under 35 U.S.C. 154(b) by 363 days.

(21) Appl. No.: 09/598,146

(22) Filed: Jun. 21, 2000

(51) Int. Cl.$^7$ .............................................. G06F 19/00
(52) U.S. Cl. ........................................ 700/98; 345/420
(58) Field of Search ...................... 700/97–98, 182–184; 345/420, 421

(56) References Cited

U.S. PATENT DOCUMENTS

| | | | |
|---|---|---|---|
| 4,736,306 A | 4/1988 | Christensen et al. | 345/420 |
| 5,138,697 A | 8/1992 | Yamamoto et al. | 345/420 |
| 5,189,626 A | 2/1993 | Colburn | 700/182 |
| 5,216,616 A | 6/1993 | Masters | 264/401 |
| 5,341,461 A | 8/1994 | Kikuchi et al. | 345/420 |
| 5,351,196 A | 9/1994 | Sowar et al. | 700/182 |
| 5,388,199 A | 2/1995 | Kakazu et al. | 345/853 |
| 5,454,069 A | 9/1995 | Knapp et al. | 345/420 |
| 5,481,465 A | 1/1996 | Itoh et al. | 700/118 |
| 5,537,519 A | 7/1996 | Vossler et al. | 345/420 |
| 5,552,995 A | 9/1996 | Sebastian | 700/97 |
| 5,561,601 A | 10/1996 | Inoue et al. | 700/182 |
| 5,659,478 A | 8/1997 | Pennisi et al. | 700/95 |
| 5,684,725 A | 11/1997 | Numao et al. | 703/2 |
| 5,689,435 A | 11/1997 | Umney et al. | 703/1 |
| 5,701,403 A | 12/1997 | Watanabe et al. | 345/419 |
| 5,710,709 A | 1/1998 | Oliver et al. | 700/184 |
| 5,745,117 A | 4/1998 | Masuda et al. | 345/420 |

FOREIGN PATENT DOCUMENTS

WO    WO 99/62032    5/1999    ............. G06T/7/00

*Primary Examiner*—Leo Picard
*Assistant Examiner*—Zoila Cabrera
(74) *Attorney, Agent, or Firm*—Bryan Cave LLP

(57) ABSTRACT

A method of generating a computer-based three-dimensional representation of an object resulting from cutting tool operations that remove portions of material from an initial tool solid is disclosed. Using data containing dimensions of the cutting tool and data concerning the tool paths (e.g., points defining the tool paths), the method involves creating a model of the initial tool solid, creating a model of the tool solid removed along each tool path, and subtracting each tool solid model removed from the initial tool solid model. The data concerning the tool paths can be derived from numerically controlled (NC) machine fabrication instructions.

20 Claims, 12 Drawing Sheets

METHOD FOR CREATING COMPUTER-AIDED DESIGN (CAD) SOLID MODELS FROM NUMERICALLY CONTROLLED (NC) MACHINE INSTRUCTIONS

FIELD OF THE INVENTION

The present invention relates to computer-aided design (CAD) processes and, more particularly, to a method for creating a three-dimensional CAD solid model of a component from the numerically controlled (NC) fabrication instructions for the component that were previously used to fabricate the component by NC machining procedures.

BACKGROUND OF THE INVENTION

Many engineering designs of machined components in current use were initially developed. prior to or without the aid of CAD systems and, consequently, electronic representations of such designs do not exist. Accordingly, updating or making modifications to such component designs using current CAD processes requires first creating a computer-based digital representation of the component. Although methods have been developed for creation of computer-based representations from component drawings, photographs, and/or shop measurements, these methods are tedious, expensive, and often produce inaccurate results.

In cases where a component has been fabricated using NC machining processes, the NC instruction file or "book" contains fabrication instructions for NC machines to follow to produce all or part of that component from a piece of raw stock material, such as a metal billet. The stock material is often referred to in the CAD environment as a "tool solid." Broadly, the NC file describes the paths along which the fabrication machine operates one or more rotating cutting tools upon the tool solid to create the machined component.

Other processes have been used to generate engineering data from NC files; however, the output from these processes has been in the form of point clouds and Stereo Lithography (STL) files, which are not fully compatible with modern CAD systems. As known in the art, a point cloud comprises a plurality of coordinates for individual points that represent locations on the surface of an object. A point cloud can be generated through scanning or digitizing. An STL format model represents the surface of an object by a plurality of triangles, each triangle defined by the coordinates of its three vertices and a single normal vector directed away from the object's surface. Thus, these methods require extensive processing of the output files before the results can be utilized on a CAD system. Accordingly, it would be desirable to have a reliable, inexpensive, and accurate method of creating a CAD solid model of a component from the machine fabrication instruction file used for its fabrication.

SUMMARY OF THE INVENTION

A method of satisfying that need and providing still other benefits has now been developed. Broadly, the present invention provides a method for creating a three-dimensional computer-aided design (CAD) solid model of a manufactured component from a numerically controlled (NC) machine fabrication instruction file. The method employs boundary representation ("B-Rep") models to define the geometric solids that represent the initial tool solid, the segments of the initial tool solid removed in the specified cutting tool operations, and the finished component. A B-Rep model represents a solid by defining its bounding surface as one or more geometric figures including points, planes, planar polygons, and spline surfaces. Starting with information contained in or derived from the NC file, such as initial tool solid dimensions, cutting tool paths, and cutting tool geometry, by successively redefining the boundaries of the machined tool solid as it is reduced through each specified tooling operation, a CAD solid model of the finished component can be generated. The method generates a three-dimensional representation of an object by creating a model of an initial tool solid with spatial boundaries that define a volume greater than that of the object, creating a model of the segment of the tool solid removed in each tooling operation (a "tool path solid"), and then subtracting each tool path solid from the initial tool solid model. The process of creating the model of each tool path solid removed can be simplified by representing the tool paths as geometric forms comprising straight line segments, arcs, spline curves, and planar segments if the deviation of the actual tool path from the perfect geometric models falls within user-defined tolerances.

The preferred process comprises two phases: preprocessing of the NC instruction files and simulation of the machining process. In the initial phase, preprocessing of the NC instruction files, irrelevant data, that is, those data that do not define cutting tool dimensions or tool paths of material cutting ("machining") operations, are eliminated. The remaining data, which comprise points defining the tool paths, are analyzed for potential representation as geometric forms comprising straight-line segments, arcs, planar segments, and B-spline curves (a form of Bezier curve defined by a uniform polynomial spline basis function). If the points defining the tool paths fall within user-defined tolerance ranges from theoretically perfect arcs, planar segments, and B-spline curves, the tool paths are approximated the by the corresponding geometric models. These geometric models can be more efficiently manipulated than the multiple individual points defining the tool paths by a computer program implementing the process, thus minimizing simulation processing time. Tool path segments that fall outside the user-defined tolerances for the arcs, planar segments, B-spline curves, etc., are modeled as a series of straight-line segments between successive tool path points.

After the NC instruction files are input, the user may initiate the automatic mode of the preprocessing (first) phase. Upon completion of the automatic preprocessing, the user has the option to further preprocess the data by reviewing all or selected portions of the data for concurrence with the determinations made during automatic preprocessing as to whether that portion of data defines points on a machining tool path, and whether the portion of the data was properly designated for modeling as one of the pre-established geometric forms. If the user determines that modification of any of the preprocessing determinations is necessary, the user may elect to recategorize any portion of the data regarding whether that portion defines points on a machining tool path, and if appropriate, the geometric model designation assigned to a machining tool path.

The second phase of the preferred process, machining simulation, begins with the creation of a solid model representing an arbitrary "initial tool solid," that is, a representation of one possible configuration of a raw material solid with spatial boundaries sufficient to encompass all of the tool paths specified in the machining instruction files. Then the program simulates the machining operation defined by each tool path in the NC file, creating a tool path solid, which represents the segment of discarded material removed by the cutting tool as it travels along the prescribed tool path.

Finally, each tool path solid is mathematically subtracted from the initial tool solid, with the remaining mathematical "solid" being the CAD model of the finished component. This modeling and subtraction of each tool path solid in the simulation phase may be selectively viewed and monitored by the operator in a user-interactive mode or accomplished autonomously by the program in a bulk processing mode.

The method of the present invention can also be used to visualize, analyze, and troubleshoot existing NC machine instructions. By selecting the user-interactive mode of the machining simulation process, the operator can visualize the cutting operations along the tool path defined by selected instructions, along with the resulting machined tool solid, to confirm the accuracy, appropriateness, and efficiency of the instructions to produce the desired end product. This verification capability enables errors and/or inefficiencies in fabrication instructions to be detected and corrected prior to actual production, thus enhancing quality and minimizing the cost and time required for production.

Broadly, in one aspect, the present invention concerns a method of generating a computer-based three-dimensional representation of an object that can be fabricated by a cutting tool operating along defined tool paths within an initial tool solid, from data containing the cutting tool dimensions and defining points on the tool paths, by creating mathematical models of the initial tool solid and the tool path solid removed along each tool path and mathematically subtracting each tool path solid model from the initial tool solid model.

In another aspect, the present invention concerns a method of generating a computer-based three-dimensional representation of an object that can be fabricated by a cutting tool operating along defined tool paths within an initial tool solid, from data containing the dimensions of the cutting tool, the dimensions of the initial tool solid, and defining points on the tool paths, by creating mathematical models of the initial tool solid and the tool path solid removed along each tool path and then mathematically subtracting each tool path solid model from the initial tool solid model.

BRIEF DESCRIPTION OF THE DRAWINGS

The invention will now be further described in conjunction with the drawings, in which.

The drawings are provided for illustrative purposes only and should not be used to unduly limit the scope of the invention.

DETAILED DESCRIPTION OF THE PREFERRED EMBODIMENT

The preferred embodiment of the present invention comprises a program in C programming language that operates with the commercially available Unigraphics® ("UG") CAD software package (available from Unigraphics Solutions Inc.) and interacts with the UG's "User Functions" subroutines. The program also utilizes various Motif® Widget software subroutines (available from Open Software Foundations) to create the graphic user interfaces (GUIs). The program operates with cutter location source ("CLS") data files and, with appropriate conversion subroutines, can also be used for other CAD instruction file formats, such as those used in CATIA® programs (available from International Business Machines Corporation).

As known in the art, CLS data files describe each cutting operation as a tool path comprising a series of coordinate points and cutting tool axis vectors that define the movement of a particular cutting tool. A "book" of data files comprises a series of paths relating to the fabrication of a component or a portion of a component.

Figure 1:
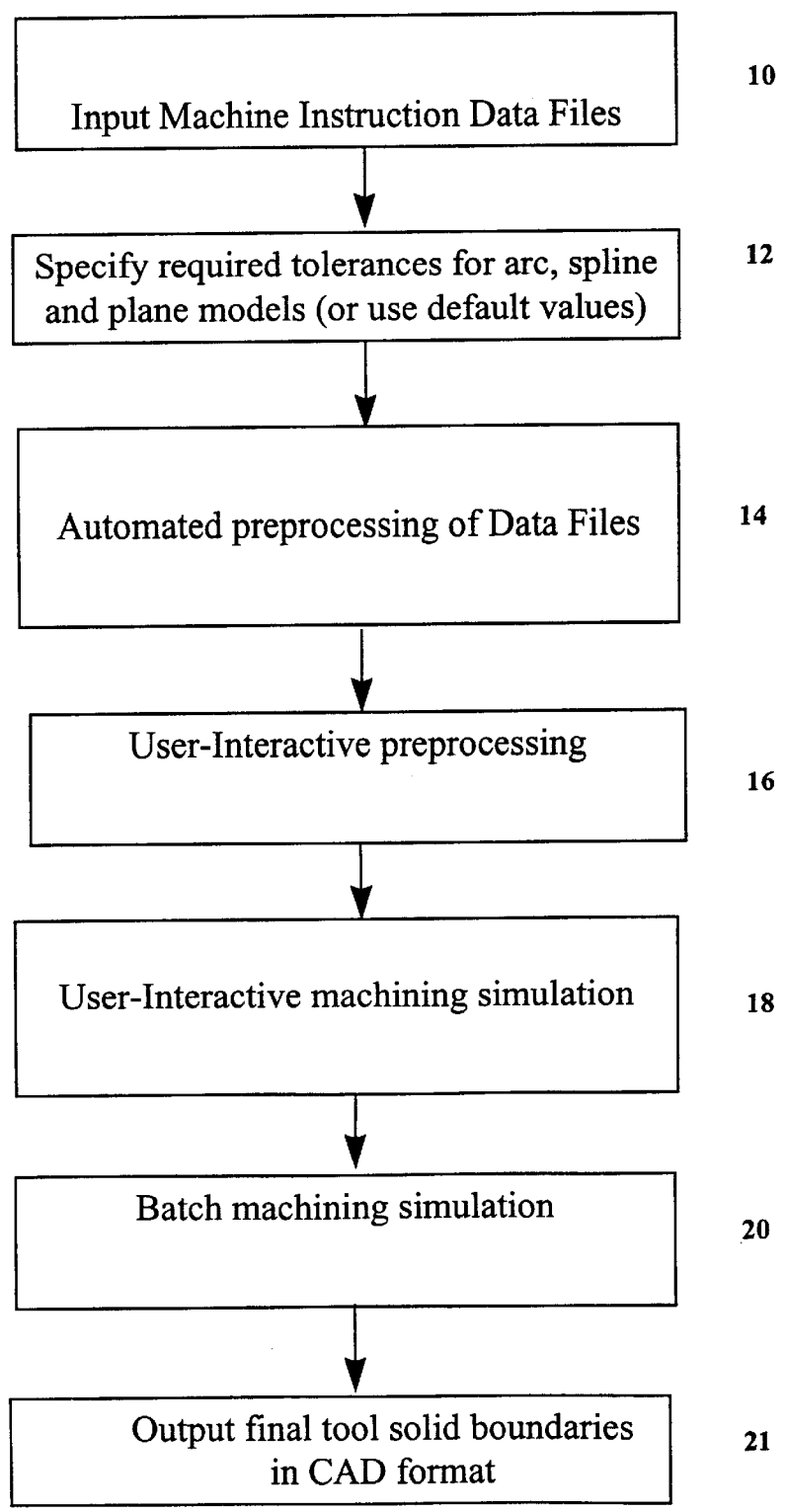
FIG. 1 is a block diagram depicting an overview of the preferred embodiment of the present invention.

FIG. 1 depicts the overview of the preferred embodiment of the process of the present invention. That process comprises four main steps, each of which is described in detail below: automated preprocessing of the input CLS data files 14; user-interactive preprocessing 16; user-interactive machining simulation 18; and batch machining simulation 20. The process preferably begins with input of machine instruction data files (step 10). Preferably, the data files include or represent dimensions of the cutting tool and the locations of points defining the tool path. Also, required tolerances for arc, spline and plane models are specified (defined) by the user (step 12). These tolerances define the range within which a series of points defining the tool path may be approximated as geometric figures, including arc, spline, and plane models. Alternatively, the tolerances may be specified (defined) as default values from, for example, a pre-stored database. These tolerances are used in the automated preprocessing phase 14. These modeling determinations can then be optionally reviewed and modified by the user in user-interactive preprocessing 16.

Upon completion of the preprocessing, machining simulation may commence. Machining simulation is the simulation of the machining of the tool solid by modeling of the successive tool path solids, that is, the material removed by the cutting tool as it sweeps along the prescribed tool paths. The machining simulation can be accomplished for selected tool paths in the user-interactive mode 18 or deferred until batch machining simulation 20. In the batch simulation mode 20, the resulting tool path solids are successively subtracted from the initial tool solid and the resulting tool solid model is output in CAD format 21. All four main steps of the presently preferred embodiment are encompassed within the GUI.

Automated Preprocessing

Figure 2:
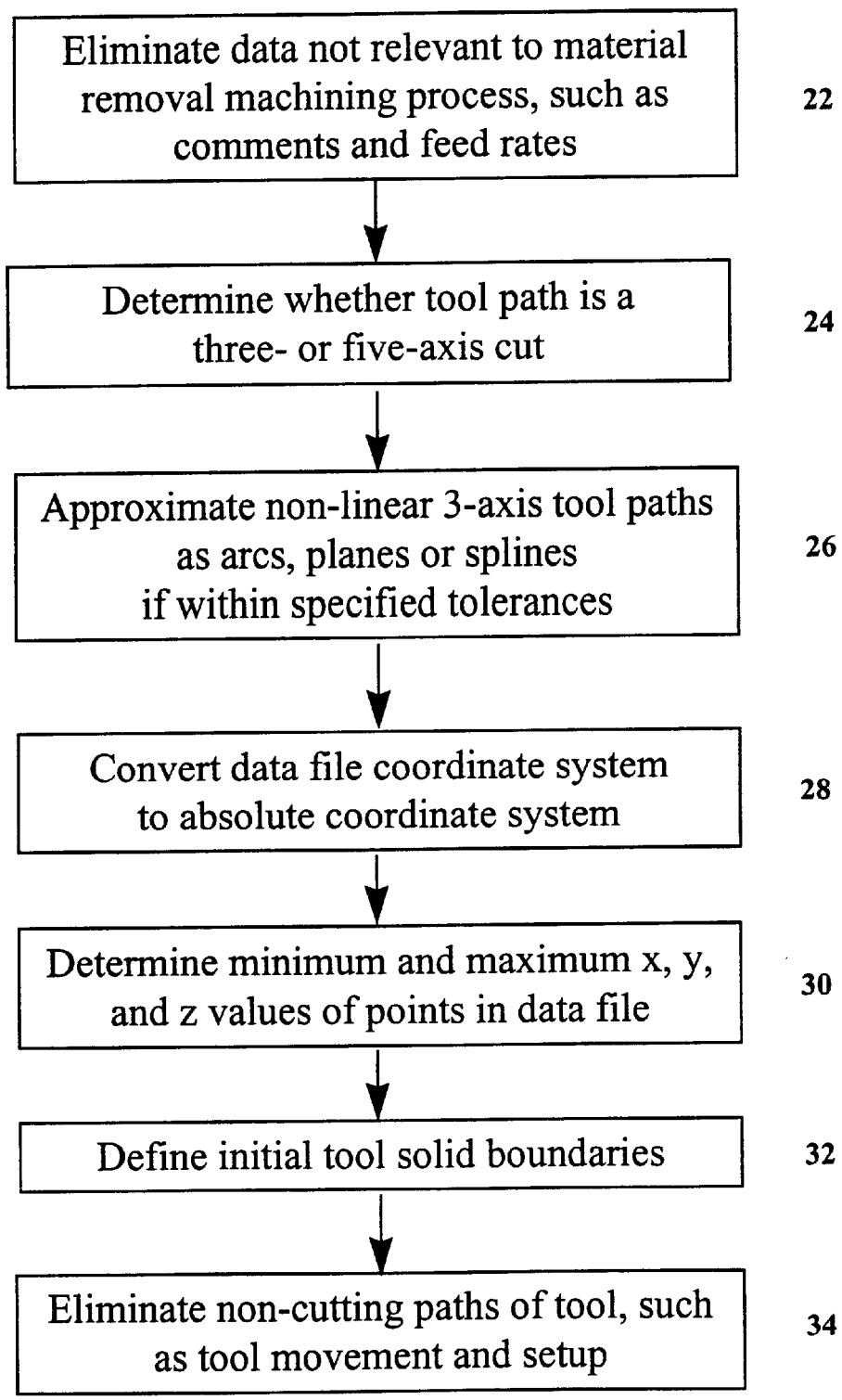
FIG. 2 is a block diagram depicting the automated preprocessing function of the preferred embodiment of the present invention.

The automated mode of the preprocessing function 14 comprises primary culling and conversion of the CLS input file without user involvement. Automated preprocessing of the data files is detailed in FIG. 2 and preferably entails the following functions:

1. Eliminate data from the NC instruction file that do not relate to dimensions of the cutting tool or the tool path, such as comments and material feed rates (step 22);
2. Determine whether each tool path represents an operation that can be conducted on a three-axis milling machine (having the capability for cutting tool movement along the X, Y and Z axes), as opposed to an operation that requires five-axis capability (tool movement along the X, Y and Z axes and two rotation axes (step 24);
3. Approximate each non-linear three-axis tool path as an arc, B-spline, or plane, if within specified tolerances (step 26), the tolerances having been specified in step 12.
4. Convert data file coordinate system to the absolute coordinate system (step 28);
5. Determine minimum and maximum x, y, and z values of tool path points for cutting operations in data file (step 30);
6. Construct the model of the initial tool solid as the geometric solid bounded by the six planes defined by both the minimum and maximum values in each of the orthogonal x, y, and z axes (step 32); and,
7. Eliminate data from the NC instruction file that do not relate to tool path points for cutting operations, such as tool setup and movement or repositioning (step 34);

In this automated preprocessing, irrelevant data, that is, data that do not relate to dimensions of the cutting tool or the tool path, are eliminated on the basis of inclusion of predetermined characters such as PPRINT (which relates to visual displays of user comments), PAINT (which relates to visual displays of tool paths), SPINDL (which relates to commands controlling rotation of the cutting tool), RAPID (which indicates a rapid tool movement), and FEDRAT (which relates to input of material feed rates) (step 22).

Next, the remaining machining tool paths are segregated into three-axis and five-axis cuts (step 24) This classification of a path as three-axis or five-axis is based upon whether the vector of the rotational axis of the cutting tool varies along the path. A three-axis cut is one in which the rotational axis vector remains unchanged along the tool path, whereas in a five-axis cut the rotational axis vector varies in at least one of the two remaining axes (other than the axis of rotation of the cutting tool).

Next, the three-axis tool paths are further analyzed to determine if they fall within the appropriate tolerances to be modeled as arcs, B-splines, or planar segments (step 26). Otherwise, three-axis paths are modeled as a series of straight line segments. Modeling tool movements as arcs, B-splines, and planes minimizes the machining simulation processing time and reduces the complexity of the resulting tool path solid models. Five-axis paths, due to their greater complexity, must be simulated as a series of point-to-point movements. The five-axis model, therefore, is reserved for the more complex tool movements that cannot be modeled as three-axis line segments, arcs, B-splines, or planes. A preferred approach for this modeling analysis is set forth below.

Arc Analysis. In the automated preprocessing function, the points comprising a three-axis tool path are first evaluated for potential representation as an arc (segment of a circle). The evaluation process is as follows: (1) the center point of the arc defined by the first three successive points on a given tool path is determined; (2) using the next (fourth) point on the tool path, along with the last two (second and third) points from the previous calculation, a new arc center is determined; (3) if the difference between the successive calculated arc centers is less than the defined tolerance, the tool path along all four points is represented by the same arc. This process of representing the tool path segment as an arc continues along the successive points on the tool path until the difference between two successive center points exceeds the allowed tolerance. The tolerance usually will be no greater than 1.0 inches, and preferably no greater than 0.7 inches. A typical tolerance for an arc is 0.5 inches. Those tool path segments for which the arc modeling tolerance is exceeded proceed through further analysis for potential modeling as B-splines or planes.

B-spline Analysis. Similarly, whether the B-spline approximation can be used for a series of points on a three-axis tool path is determined by calculating the angular difference between the two vectors defined by the first and second pairs of points in a series of three successive points. For example, vector A is calculated between points 1 and 2, and vector B is calculated between points 2 and 3. If the angular difference between vectors A and B is less than the defined tolerance, the tool path between points 1, 2, and 3 is approximated as a B-spline. The tolerance usually will be no greater than 3.0 degrees and preferably no greater than 2.0 degrees. A typical tolerance for a B-spline is 1.0 degrees. The application of this modeling approximation may optionally be further conditioned upon the radius of curvature of the spline defined by the points meeting an established minimum value. This B-spline modeling process continues for successive points on the tool path until the angular difference between two successive vectors exceeds the allowed tolerance or, if applicable, until the calculated radius of curvature at any point falls below the established minimum. Those tool path segments for which the B-spline modeling tolerance is exceeded proceed through further analysis for potential modeling as planes.

Planar Cut Analysis. Whether a planar cut approximation can be used for a series of points on a three-axis tool path is determined by comparing a fourth point on the tool path with the plane defined by the first three points. If the location of the fourth point in the Z axis of the X-Y plane defined by the first three points is within the given tolerances, the planar approximation can be used. Successive points are similarly compared to and modeled within the plane defined by the first three points until the given tolerance is exceeded. The tolerance usually will be no greater than 0.005 inches and preferably no greater than 0.002 inches. A typical tolerance for a planar segment is 0.002 inches. Tool path segments for which the plane modeling tolerance is exceeded are by default modeled as a series of straight line segments between successive tool path points.

Although the preferred order of analysis is arc, B-spline, and planar segment, with a default to straight line segments, if none of these three models is satisfactory (that is, within the respective defined tolerance), other sequences may be suitable in certain circumstances.

Next a solid model representing an arbitrary "initial tool solid" having spatial boundaries sufficient to encompass all of the tool paths specified in the machining instructions is created. In creating this initial tool solid, the program converts the data file coordinate system to an absolute coordinate system (step 28) and then maintains the minimum and maximum x, y, and z values of the tool path points in the data file (step 30). The initial tool solid is then established as the geometric solid bounded by the six planes defined by both the minimum and maximum values in each of the x, y, and z axes (step 32). Next, tool paths that represent non-cutting tool movements, such as tool repositioning, are eliminated based upon factors such as their higher tool travel rates (step 34).

Interactive Preprocessing

Figure 3:
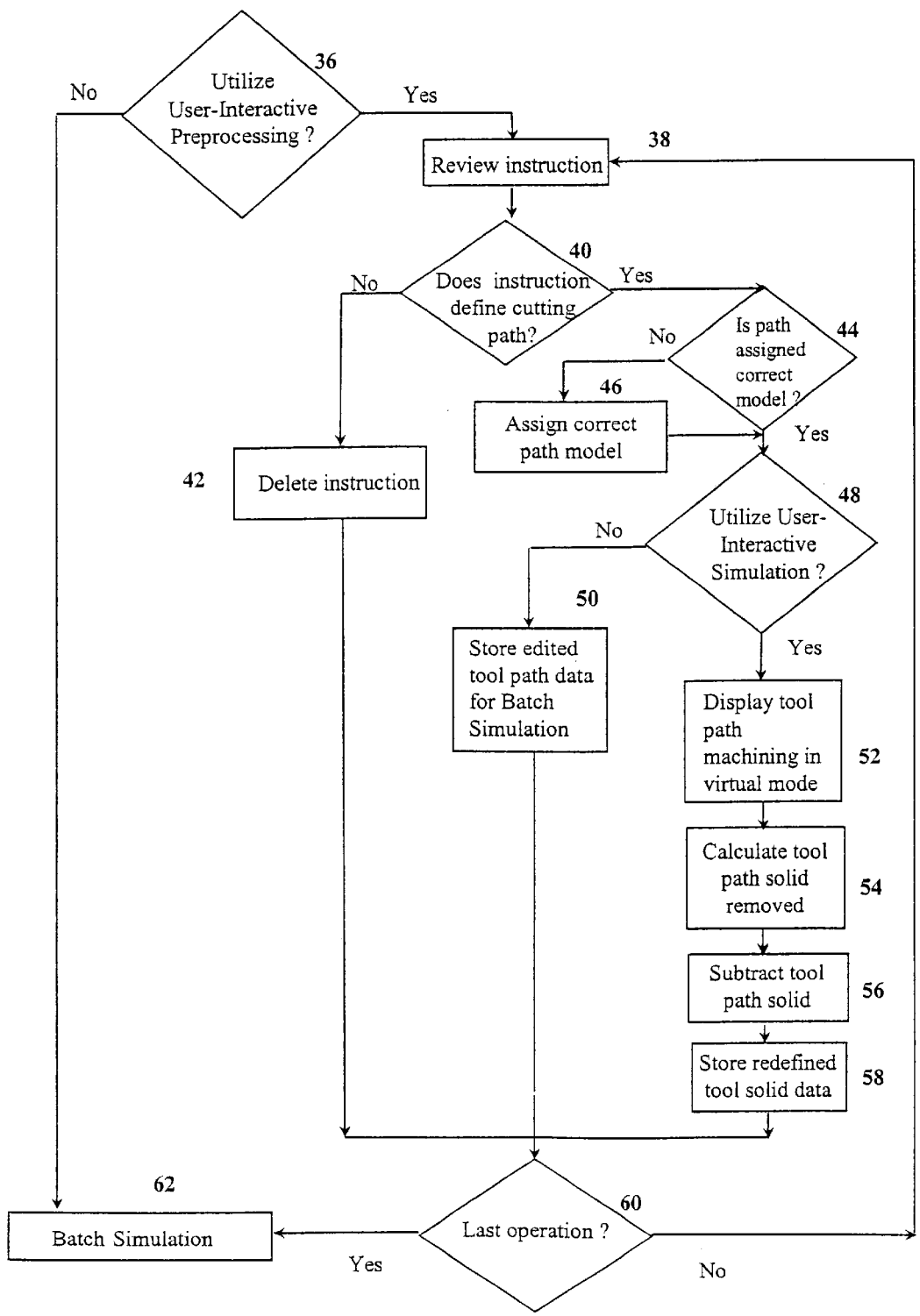
FIG. 3 is a flow chart detailing the user-interactive preprocessing and simulation functions of the preferred embodiment of the present invention.

If elected, this mode of preprocessing (step 16 in FIG. 1) involves user interaction and preferably incorporates a GUI for ease of use. The GUI may be constructed using MOTIF® Widgets and UG ("UniGraphics®") user function subroutines. As known to those skilled in the art, MOTIF® Widgets are commercially available software templates for creating graphical display windows. Similarly, UG user function subroutines are commercially available software templates, which allow the user to define geometric objects in UG CAD format. The user-interactive preprocessing and machining simulation functions are detailed in FIG. 3.

Upon completion of automated preprocessing (FIG. 2), and in preparation for user interactive preprocessing, the program creates two UG representations. The first representation displays the tool path points and the path between points, and the second depicts the solid block representing the initial tool solid. Each tool path is displayed in the color that corresponds to the geometric model that has been assigned during automated preprocessing. At this point, the user may initiate interactive preprocessing (step 36) to review and verify the accuracy of the automated preprocessing (steps 38, 40, 42, 44, and 46). If the user determines that a particular tool path does not represent a machining operation conducted upon the tool solid (step 40), the user may select one or more points, or the entire path for deletion (step 42) from the machining simulation processing. If the user determines that a tool path may be more accurately modeled as a different geometric figure (step 44), the user may select one or more points, or the entire path for reclassification (step 46) from the initial model that had automatically been designated to an arc, plane, B-spline, or straight line model, as appropriate.

Machining Simulation

Figure 4:
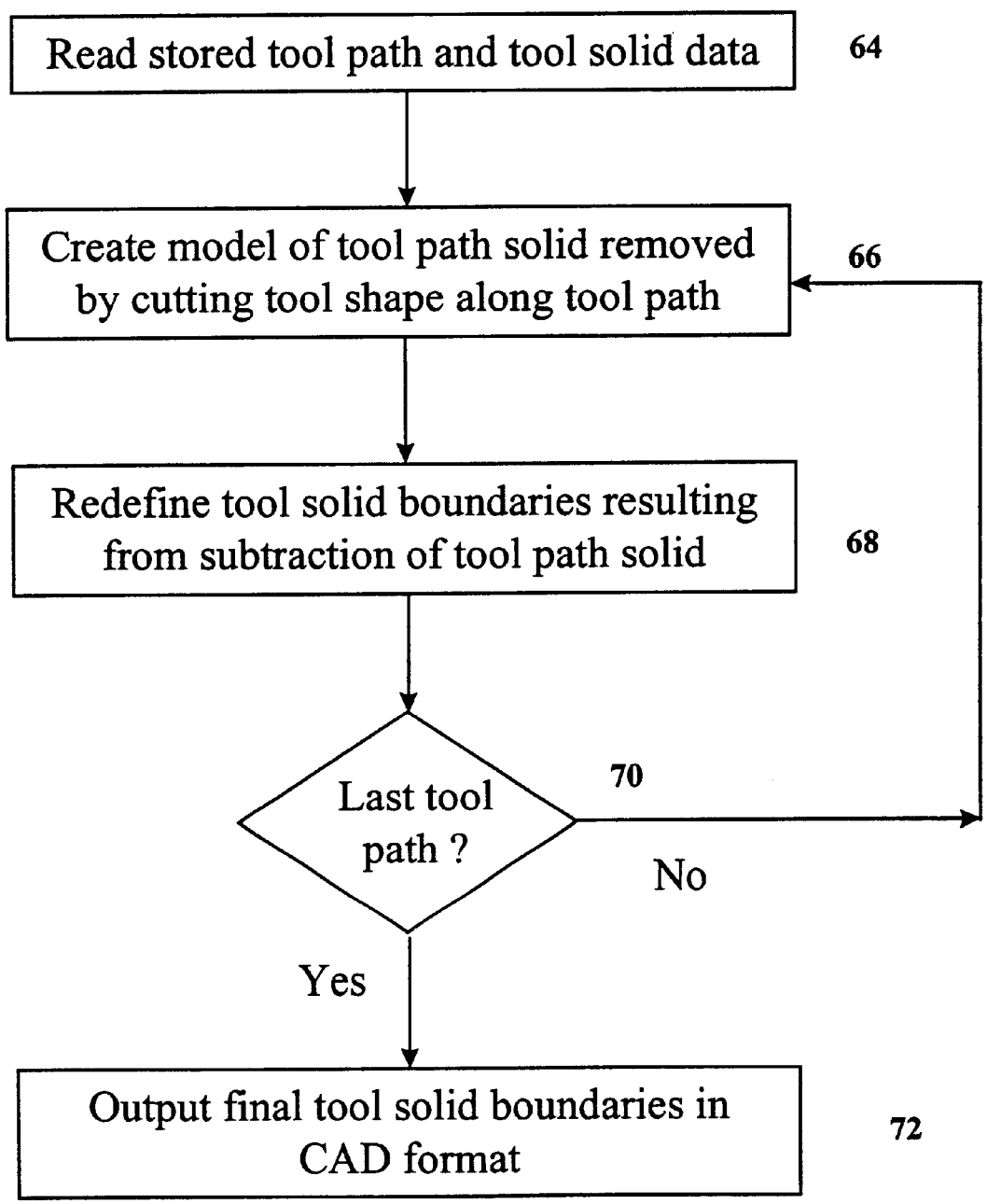
FIG. 4 is a flow chart detailing the batch simulation function of the preferred embodiment of the present invention.

Once the user has selected a path and preprocessed it as desired, the user may elect (step 48) to immediately simulate and view the cutting operation for the path in virtual machining mode (step 52), which allows the user to view the machining simulation process on a display, or to store the tool path data to a file for batch simulation at a later time (step 50). Virtual machining simulation (steps 52, 54 and 56) involves only the currently selected path and is displayed in real time on the user display. (The batch simulation mode (step 62), on the other hand, autonomously runs every path contained in the instruction file.) Once the tool path solids are constructed in the virtual mode for each tool path selected by the user, if deemed acceptable by the user, they are subtracted from the tool solid to form the resulting tool solid, which is stored in a file (step 58) for retrieval during batch simulation. The batch simulation function (step 62) is detailed in FIG. 4.

Whether accomplished in the virtual or batch mode, the simulation process analyzes the dimensions and movement of the cutting tool and thereby determines the removal of material from the tool solid (step 54 and following or step 66 and following). The program creates a tool path solid, which is a data representation of the material displaced by the cutting tool in its static initial position and the material removed along the path of the cutting tool as it travels from point to point in the CLS file. After it is defined in either the interactive mode (step 54) or in the batch mode (step 66), each tool path solid is then subtracted from the tool solid either in the interactive mode (step 56) or in the batch mode (step 66) to determine the resulting redefined tool solid boundaries (step 58 or step 68). Once all the tool path solids have been removed from the tool solid (step 70), the final tool solid boundaries are output in CAD format (step 72).

Cutting Tool Geometry

Figure 5:
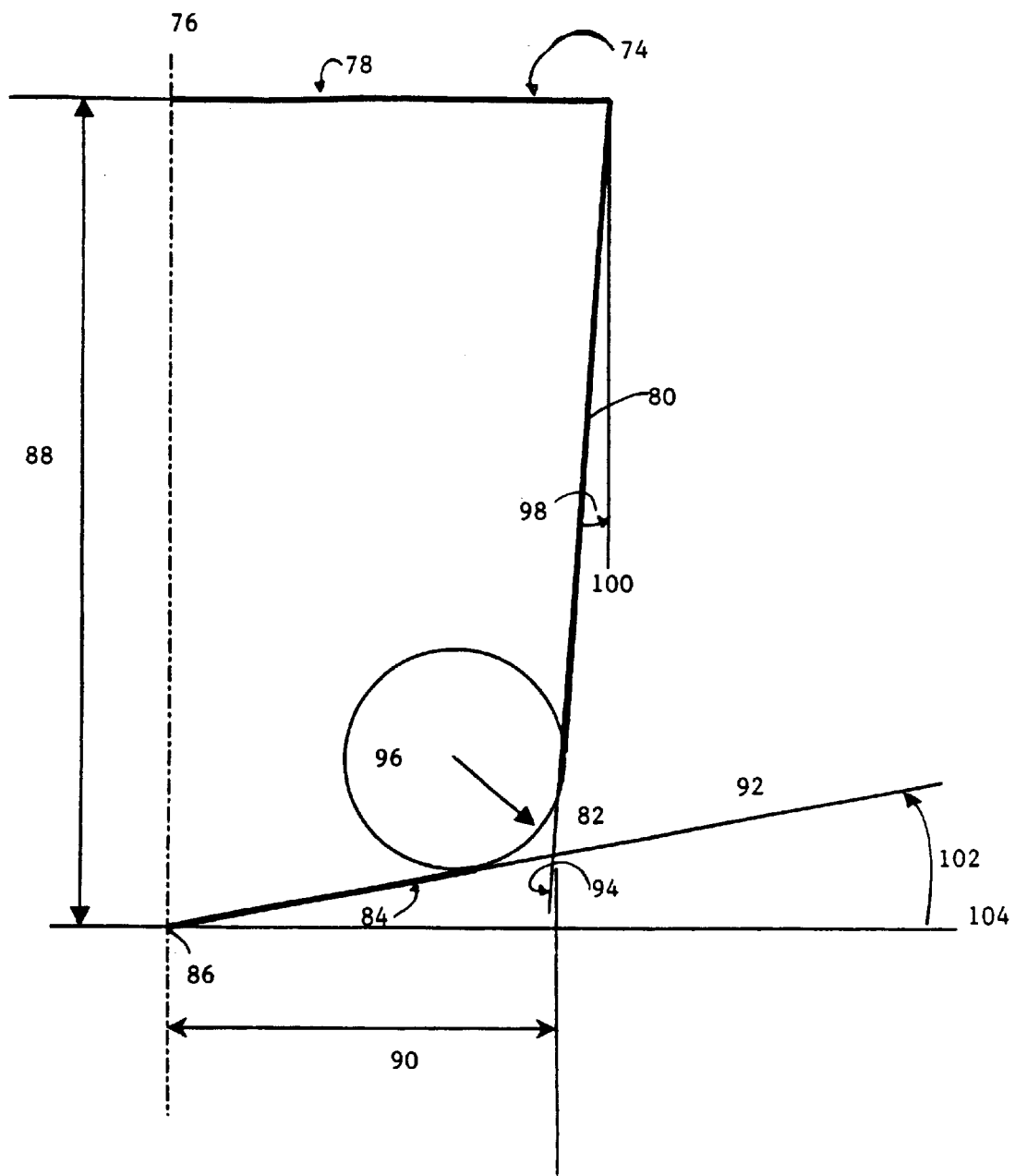
FIG. 5 is a diagram depicting the profile geometry of an exemplar cutting tool as defined in an NC file.

FIG. 5 depicts the profile geometry of an exemplar cutting tool 74 in a cross-section view through the axis of rotation (broken line 76) as defined in a typical CLS data file. The cutting tool profile is defined by an upper surface 78, an outer surface 80 extending from the outer edge of the upper surface 78 to a corner transition 82, which forms a radius transitioning to the lower surface 84. The tip 86 of the cutting tool is the point on the lower surface 84 through which the axis of rotation 76 passes. The height 88 of the cutting tool is the distance from the upper surface 78 of the tool to the tip 86. The cutter radius 90 is the distance from the axis of rotation 76 to the point of intersection between the lower surface line 92 and the outer surface line 94. The corner radius 96 is the radius of the corner transition 82 between the outer surface 80 and the lower surface 84. The taper angle 98 is the angular displacement of the outer surface line 94 from a vertical reference line 100 parallel to the axis of rotation 76 passing through the intersection of the outer surface 80 and the upper surface 78. The tip angle 102 is the angular displacement between the lower surface line 92 and the horizontal reference plane 104 normal to the axis of rotation 76 passing through the tip 86.

Tool Solid Modeling

The simulation process uses five geometric models to define the material segment removed throughout each movement of the cutting tool. The model used depends upon the determination made during automated preprocessing or, if applicable, during user-interactive preprocessing as to whether the cutting tool movement can be most accurately represented as (1) a straight line three-axis cut, (2) a circular segment (arc), (3) a B-spline curve, (4) a planar segment, or, in the case of a five-axis cut, (5) as a series of point-to-point movements.

Straight Line Three-axis Cutting Paths

Straight line three-axis cuts are modeled by determining the cross-section of the cutting tool perpendicular to the direction to the next point on the tool path. This cross-sectional area is then integrated along the straight line tool path to quantify the segment of material removed. This straight line modeling process is illustrated in FIG. 6.

Figure 6:
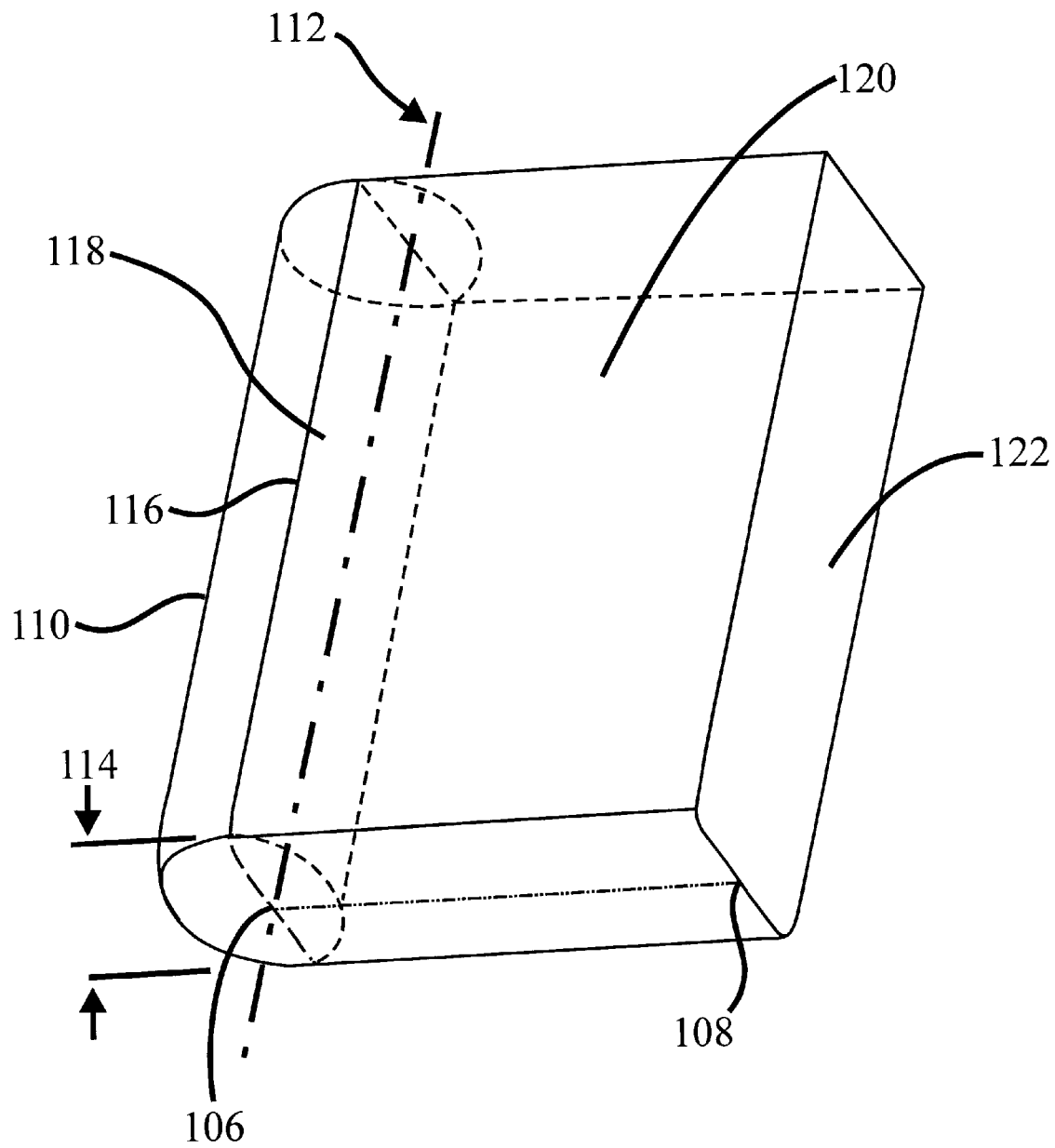
FIG. 6 is a diagram illustrating the straight line modeling process.

As illustrated in FIG. 6, the straight line tool path is defined by the starting point 106 and the end point 108. The outer surface 110 of the approximately cylindrical cutting tool having its cutting tool axis 112 passing through the tool path starting point 106, having a cutting tool diameter 114 (which may remain constant across the cutting tool axis 112 as in the case of a cutting tool having a cylindrical profile, and which diameter may vary along the cutting tool axis 112 as in the case of a cutting tool having a tapered profile), and having a height 116 equal to the cutting tool height is constructed. Next, the cross-section of the cutting tool in the plane perpendicular to the tool path 118 at starting point 106 is determined. This cutting tool cross-section 118 is then integrated along the tool path (from starting point 106 to end point 108) in the plane perpendicular to the tool path at that point on the tool path to form the straight line tool path solid 120. This straight line tool path solid 120 thus comprises an approximately rectangular right solid having a thickness equal to the diameter of the cutting tool 114 at that point along the cutting tool axis 112, and which is bounded by the starting point cutting tool cross-section 118 and the end point cutting tool cross-section 122.

Arc Cutting Paths

A similar method is used to model arc cuts, except that the tool cross-section is integrated along a segment of a circle, rather than a straight line segment. This arc modeling process is illustrated in FIG. 7.

Figure 7:
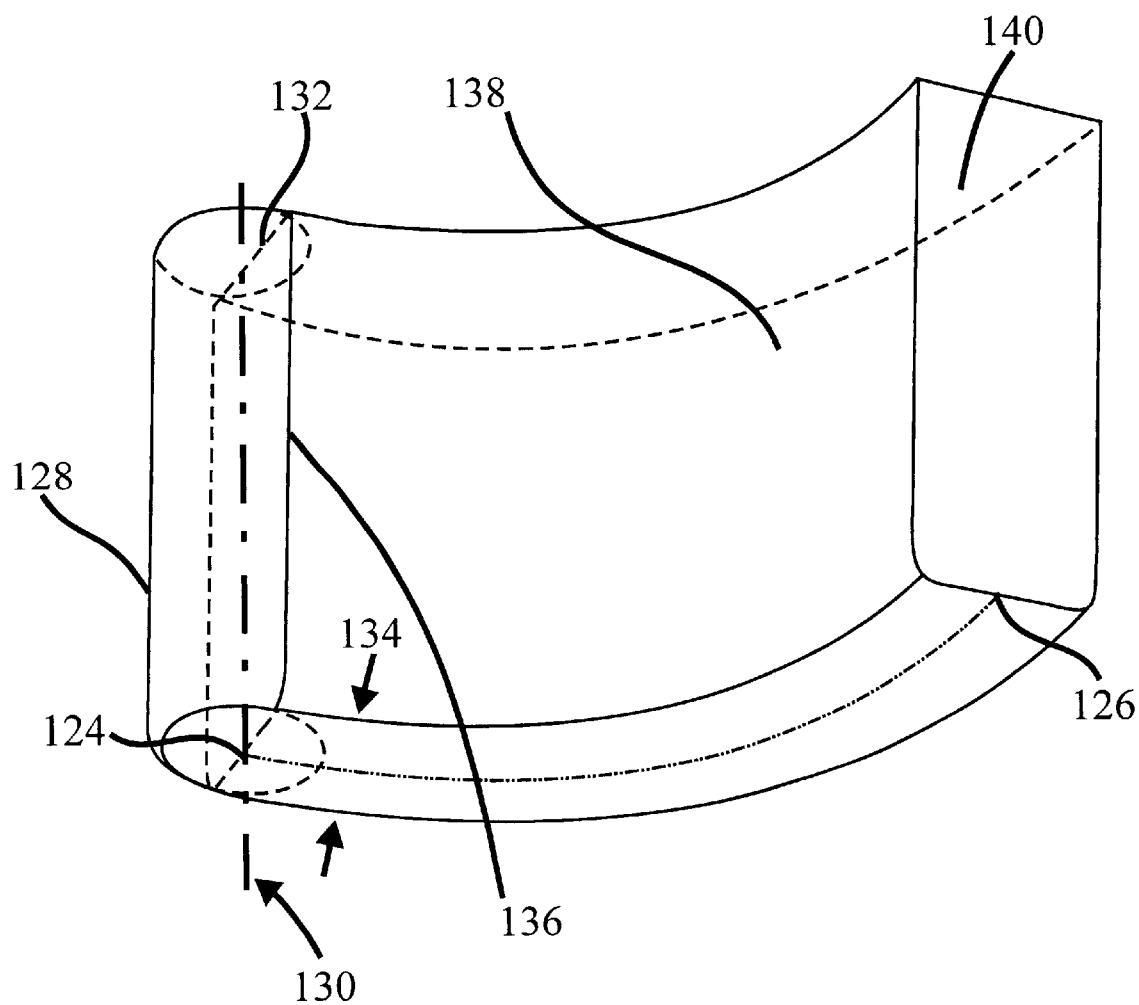
FIG. 7 is a diagram illustrating the arc modeling process.

As illustrated in FIG. 7, the arc tool path is defined by the starting point 124 and the end point 126. The outer surface 128 of the approximately cylindrical cutting tool having its cutting tool axis 130 passing through the tool path starting point 124, having a cutting tool diameter 132 (which may vary along the cutting tool axis 130), and having a height 134 equal to the cutting tool height is constructed. Next, the cross-section of the cutting tool in the plane perpendicular to the tool path 136 at starting point 124 is determined. This cutting tool cross-section 136 is then integrated along the tool path (from starting point 124 to end point 126) in the plane perpendicular to the tool path at that point on the tool path to form the arc tool path solid 138. This arc tool path solid 138 thus comprises a solid having a thickness equal to the diameter of the cutting tool 132 at that point along the cutting tool axis 130, and which is bounded by the starting point cutting tool cross-section 136 and the end point cutting tool cross-section 140.

B-spline Cutting Paths

Figure 8:
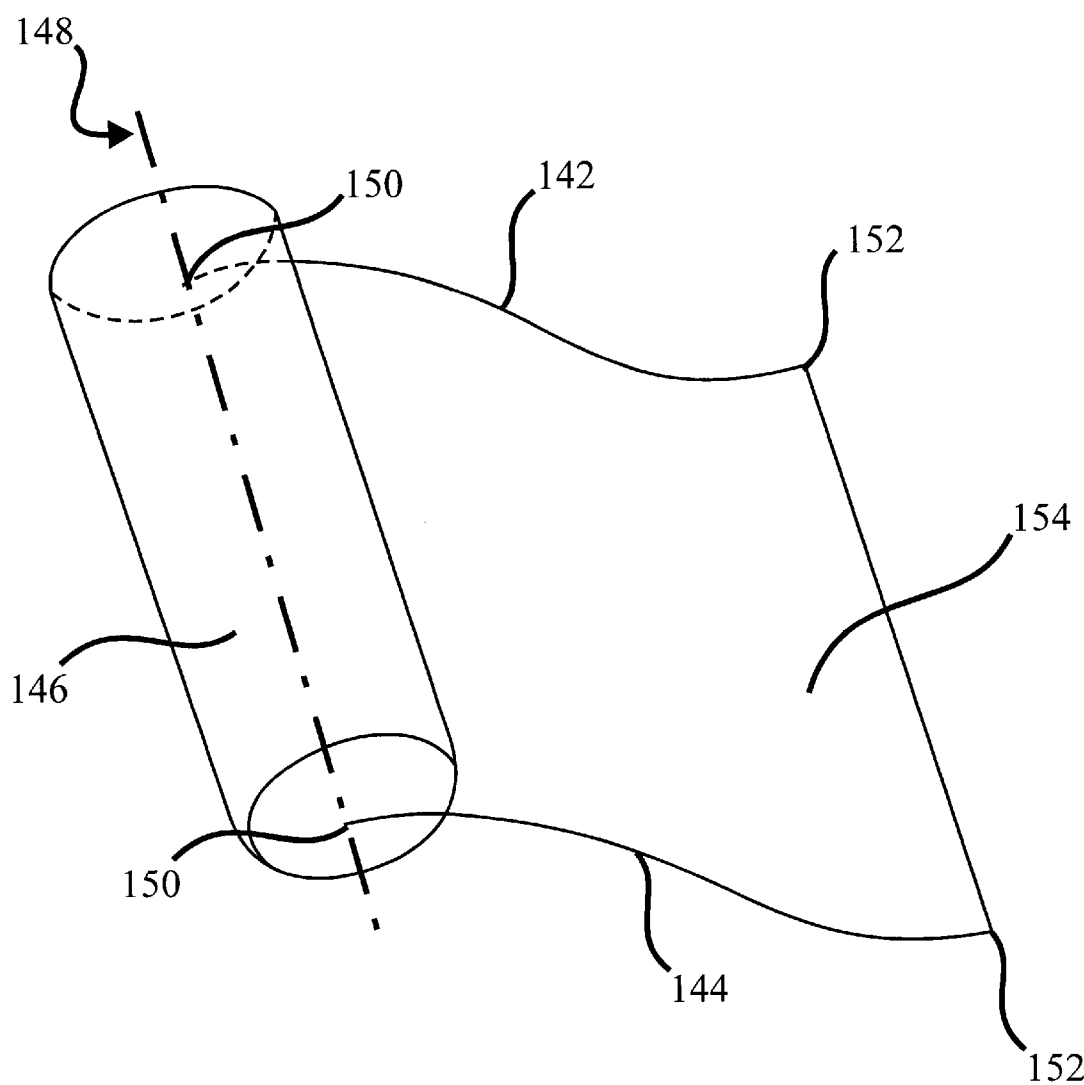
FIG. 8 is a diagram illustrating one aspect of the spline modeling process.

As is known to one skilled in the art, a B-spline is a form of Bezier curve defined by a uniform polynomial spline basis function. As illustrated in FIG. 8, B-spline cuts are modeled by creating two B-spline curves 142 and 144. These curves are defined by the location of the points at the top and bottom, respectively, of the cutting tool 146 through its cutting tool axis 148 in its sweep along the tool path from the starting points 150 through the end points 152.

Figure 9:
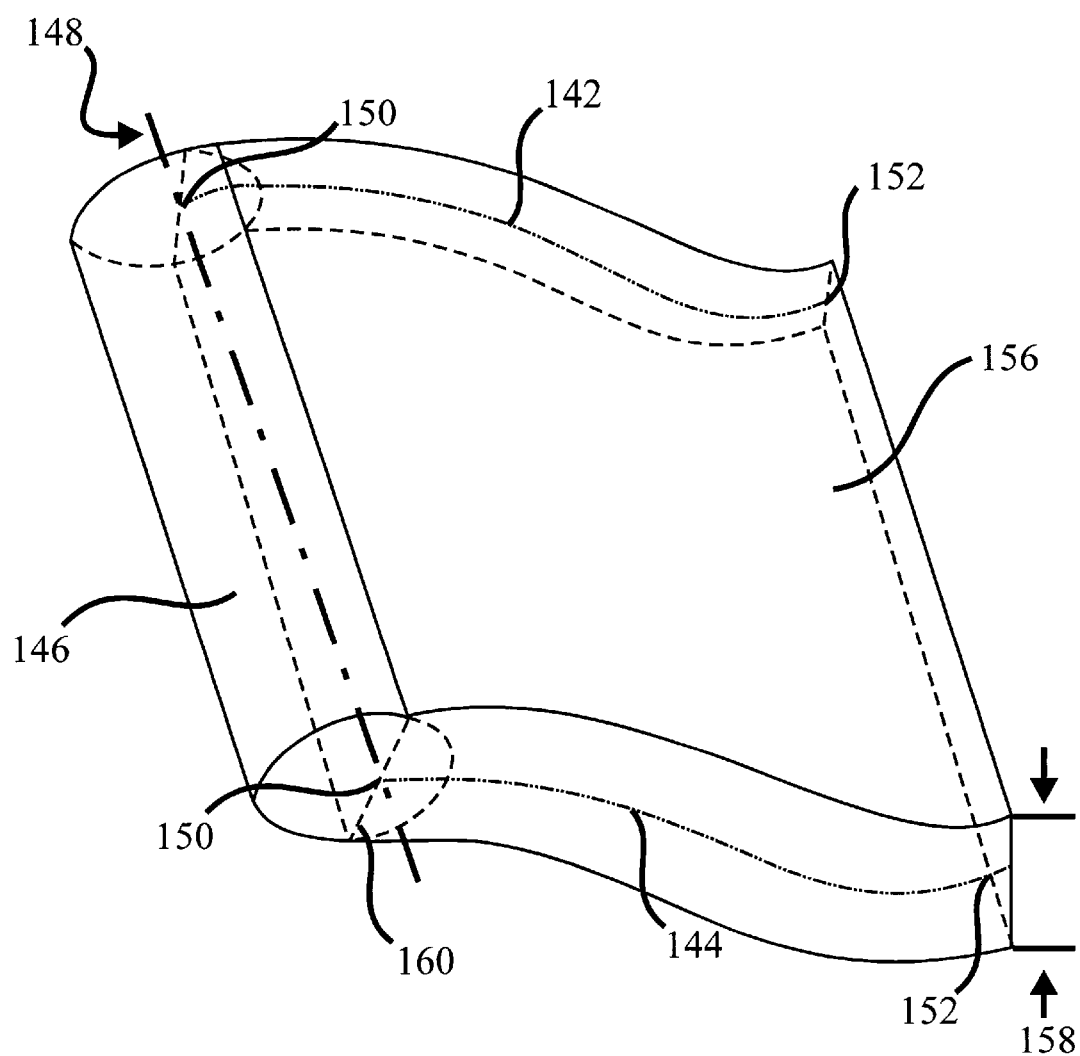
FIG. 9 is a diagram illustrating another aspect of the spline modeling process.

Next, as illustrated in FIG. 9, the two-dimensional surface (154 in FIG. 8) defined between these top 142 and bottom 144 B-spline curves is converted to a three-dimensional solid 156 with a thickness 158 equal to the diameter of the cutting tool 160 at that point along the cutting tool axis 148.

Planar Cuts

Planar cuts are modeled by creating a series of bounded plane segments that represent each tool movement within a plane. The basic plane segment model of the cut is bounded at the initial tool path point by a semi-circular arc equal to the diameter of the rotating cutting tool, which defines the entry point of the tool. The sides of the figure are two parallel line segments defining the width of the cut. A final line segment perpendicular to the tool path, defining the end of the cut, completes the figure.

For more efficient processing, two larger arbitrary bounded planes, $BP_1$ and $BP_2$, may be used as intermediate reference models for constructing the final model of the material removed in the planar cut operation. $BP_1$ is a planar segment with boundaries extending an arbitrary distance beyond the outer boundaries of the planar figure comprising all of the plane segments representing each tool path in the planar cut. For example, in the preferred embodiment, the boundaries of $BP_1$ extend a distance equal to one cutting tool diameter beyond the tool paths that create the planar cut. Similarly, $BP_2$ is a larger planar segment with boundaries extending a distance equal to two cutting tool diameters beyond the outer boundaries of the planar figure comprising the plane segments representing each tool path in the planar cut. Once all the plane segments representing each of the tool paths are subtracted from $BP_1$, the remaining figure is a planar segment border or ring, approximately one tool diameter in width, outlining the recess cut by the tool. At this point, the area wherein the machining operations take place is represented by a void in $BP_1$. However, a positive planar figure is required for integration into a tool path solid. To obtain the positive planar footprint of the tool solid that is removed in the machining operation, $BP_2$, the larger arbitrary plane, is subtracted from the modified $BP_1$, thus leaving only a plane segment outlining the area in the tool solid created by the cutting tool. This two-dimensional footprint of the removed material is then converted to a three-dimensional tool path solid with a thickness equal to the height of the cutting tool. This resulting tool path solid is in the proper format for subtraction from the tool solid.

Five-axis Cuts

Finally, five-axis cuts are modeled in the same manner as B-splines except that two series of connected line segments are created, one each at the top and bottom of the cutting tool, between each pair of adjacent points along the tool path. The surface defined between these top and bottom tool path line segments is then converted to a three-dimensional solid with a thickness equal to the diameter of the cutting tool at that point along the cutting tool axis.

Program Details

Details of the programming of the preferred process are described below in terms of the programs and configuration for the GUIs, data structure, automated preprocessing function, and machining simulation function. Although those skilled in the art will appreciate that the preferred process described herein may be implemented in many ways, set forth below is one such implementation. Of course, all other implementations of the process are within the scope of the present invention.

GUI Description

Figure 10:
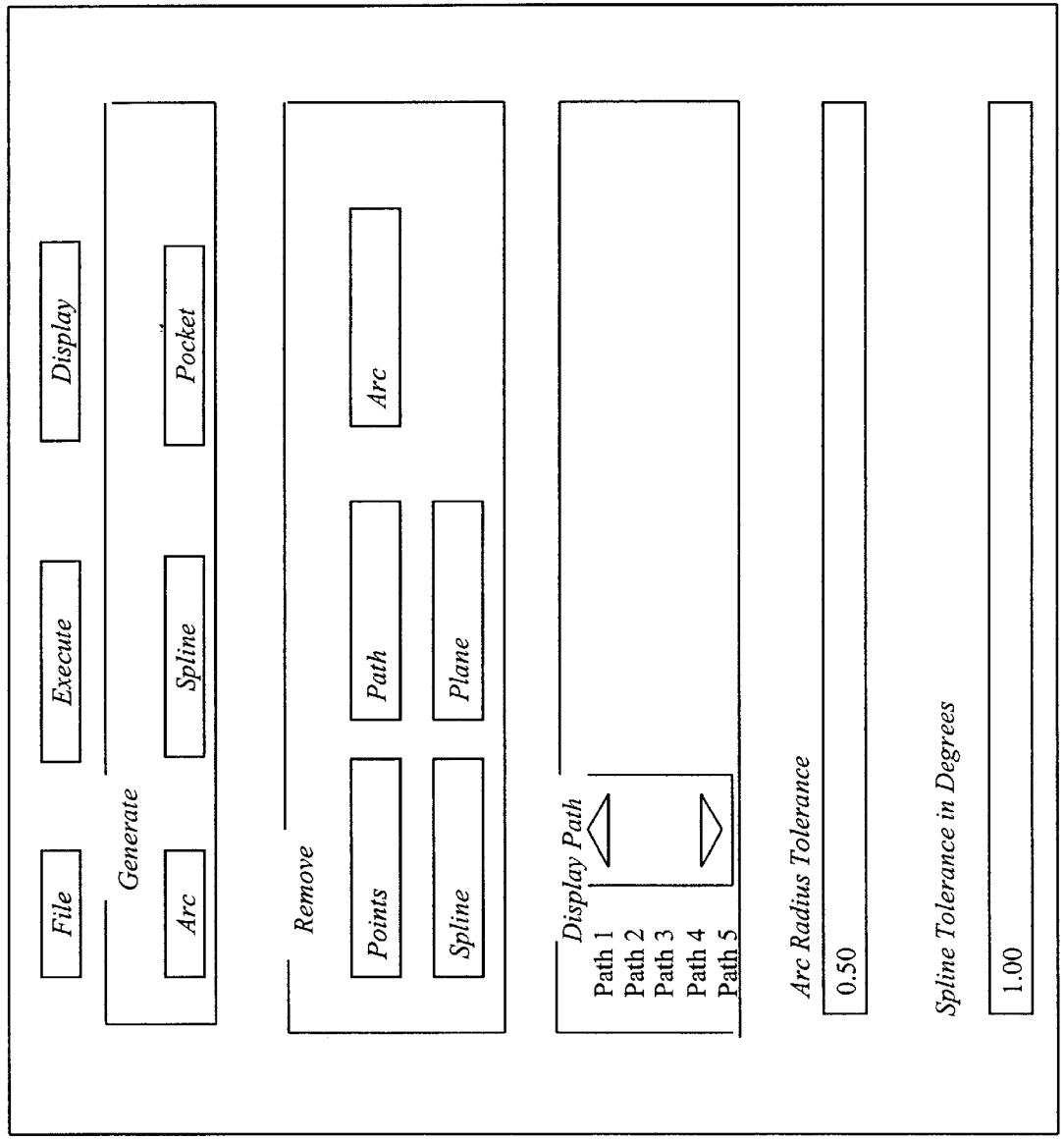
FIG. 10 is a diagram depicting a visual display of the graphic user interfaces ("GUIs") for the preferred embodiment of the present invention.

FIG. 10 is a diagram depicting a visual display of the GUIs for the preferred embodiment of the present invention. As depicted in FIG. 10, the GUI visual display offers the user three top-level buttons, "File," "Execute," and "Display," which are pull down menus. The File button offers five function options, while the Display and Execute buttons each have two. The user may also select from "Generate," "Remove," and "Display Path" button options. The functions performed by selection of these options are described below.

File Buttons Options:

Open This function allows the user to open a new unprocessed CLS file or an existing processed CLS file and its associated tool solid.

Export to PS This selection exports the tool solid to a Parasolid® (a program available from Unigraphics Solutions Inc.) file, and closes the processing of current tool solid. It then creates a new tool solid and imports the Parasolid® file. This procedure removes data relating to unnecessary parametric features associated with the tool solid, such as removed material segments or connections to other components, thereby reducing the complexity of the tool solid data.

Save This function correlates a file reference name to a partially processed tool solid file for future completion.

Close This function closes the current CLS file and its associated tool solid.

Quit This function terminates the processing session.

Display Button Options:

Vectors This function displays the vectors as defined in the CLS file. It defines the tool axis from the bottom center of the cutting tool through the top center.

Path Info This function displays information about the selected path, including the sequence number of the selected path out of the total number of paths, the number of points in the path, the number of separate tooling operations defined by the path, and the cutting tool dimensions including diameter, height, and corner radius.

Execute Button Options:

Interactive This function initiates the simulation of the machining process defined by the current path, which is displayed for the viewer.

Send to File This function stores the current path data to a file to be run in batch mode at a later time.

Generate Buttons:

Arc This function allows the user to select a set of points to determine if they can be approximated with an arc.

Spline This function allows the user to select a set of points to determine if they can be approximated with a B-Spline.

Pocket This function allows a user to create a single solid to represent the total material removed in fabricating a pocket. A pocket is a depression in any surface of the tool solid that is fabricated by a series of repetitive planar machine operations at incremental depths. The material removed from the pocket can be determined by the boundaries defined by the final machine operation. The resulting tool path solid is more efficiently processed than the actual number of separate planar cuts necessary to complete the machining operation.

Remove Buttons:

Points This function allows the user to remove selected points from the tool path data file.

Path This function removes the entire selected path from the tool path data file.

Arc This function converts points represented as an arc to a simple three-axis straight-line cut.

Spline This function converts points represented as a B-Spline to a simple three-axis straight-line cut.

Plane This function converts points represented as a plane to a simple three-axis straight-line cut.

Display Path:

This function displays a scrolled list of paths contained in the book. The path selected by the user from the list is defined as the current path and displayed.

Tolerance Boxes:

The GUI also displays user-defined tolerances in the Tolerance Boxes:

Arc Radius The user-defined tolerance is used in the automated preprocessing function to determine whether a tool path defined by a given series of points can be approximated by an arc.

Spline The user-defined tolerance is used in the automated preprocessing function to determine if a series of points can be approximated using a B-Spline curve function.

GUI Construction Programs

Ten functions are used to construct the GUI:

| PPgui | FileM | DispM | ExecM |
|---|---|---|---|
| GenerateBox | SelectFile | ToleranceBox | ToleranceBoxSpline |
| GenerateList | RemoveBox | | |

Figure 11:
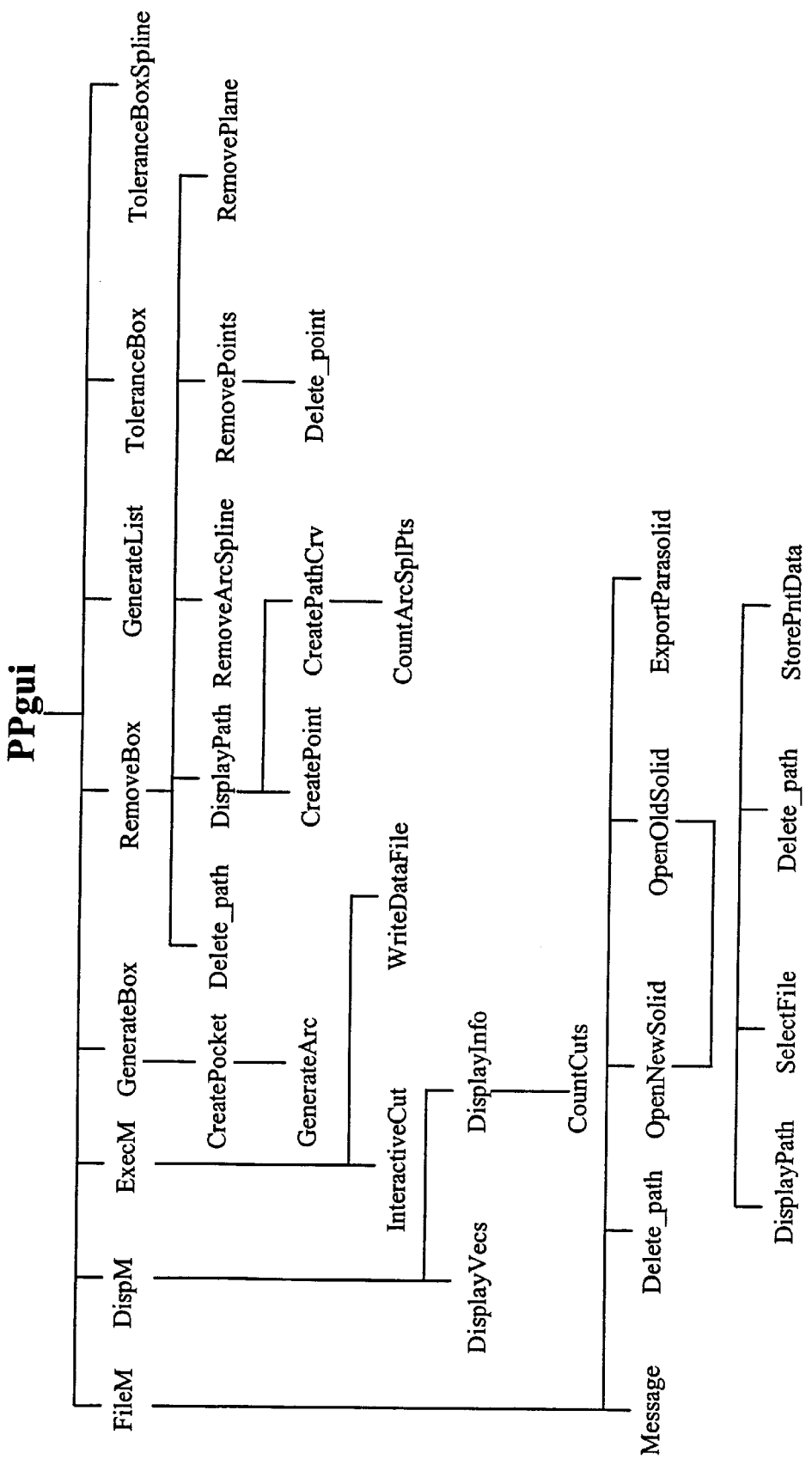
FIG. 11 is a chart detailing the hierachy of function calls for the GUIs for the preferred embodiment of the present invention.
Figure 12:
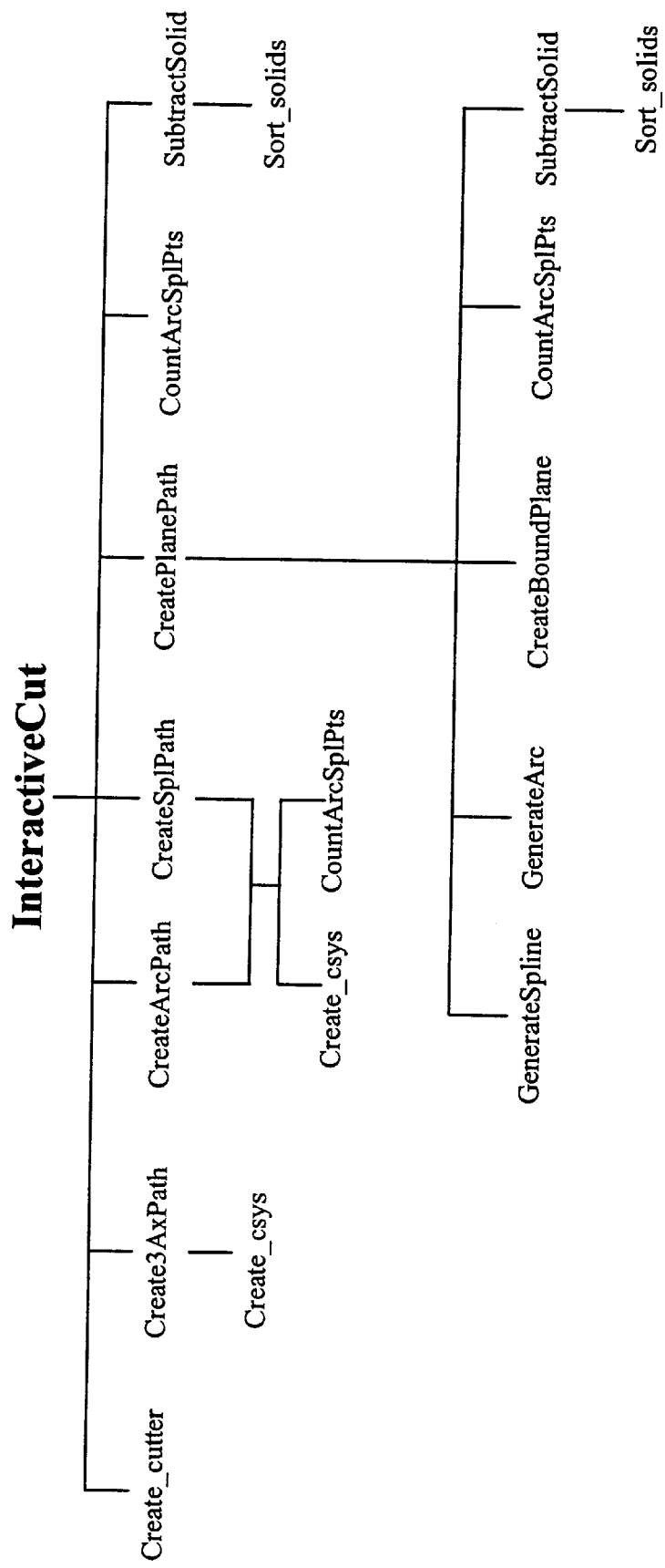
FIG. 12 is a chart detailing the hierachy of function calls for the user-interactive machining simulation program GUIs for the preferred embodiment of the present invention.

FIG. 11 depicts the hierarchy of the function calls in the GUI construction and GUI functionality programming. FIG. 12 depicts the hierarchy of the function calls under the InteractiveCut function identified in FIG. 11.

PPgui establishes the main menu bars and sets up interaction with Motif Widgets.

FileM establishes access to the appropriate program files which are selected by the user from pull down menu items for operations involving tool path data files, such as opening and closing selected files.

DispM establishes access to the appropriate program files which are selected by the user from pull down menu items options for information displayed to the user, such as DisplayVecs and DisplayPath.

ExecM establishes the files for execution of the two alternatives for machining simulation presented to the user in step 48: 1) interactive viewing of the machine simulation (steps 52, 54, and 56); and 2) writing of the edited data to a file (storing) for later batch processing (step 50).

GenerateBox defines the interface that allows the user to select a set of points to determine if they can be approximated with an arc, spline, or a pocket.

SelectFile creates a file selection dialog using a Motif file selection Widget to allow the user to select an individual CLS file or book for operation.

ToleranceBox allows the user to input the tolerances for arc modeling determinations.

ToleranceBoxSpline allows the user to input the tolerances for B-spline modeling determinations.

GenerateList displays a scrolled list of paths contained in the NC instruction book from which the user may select a path to be processed.

RemoveBox defines the interface that allows the user to remove selected points or paths from the tool path data file.

GUI Functionality Programs

The following sixteen functions can be selected by the operator during user-interactive preprocessing for execution from the GUI:

| DisplayInfo | DisplayPath | DisplayVecs | OpenNewSolid |
|---|---|---|---|
| OpenOldSolid | StorePntData | Delete_path | Delete_point |
| ExportParasolid | GenerateArc | GenerateSpline | Message |
| RemoveArcSpline | RemovePlane | RemovePoints | WriteDataFile |

With the exception of GenerateSpline, these functions are illustrated in FIG. 11 which depicts the hierarchy of the function calls in the GUI construction and GUI functionality programming. GenerateSpline, which falls under the InteractiveCut function identified in FIG. 11, is illustrated in FIG. 12.

DisplayInfo displays information to the user such as number of tool paths and information relating to the cutting tool geometry and provides information concerning selected paths, such as whether the path is a three-axis or five-axis cut and the number of points defining the path.

DisplayPath displays the selected tool path along with the code assigned for the particular geometric model assigned during automated preprocessing.

DisplayVecs displays the tool axis vector at each point along the selected tool path.

OpenNewSolid establishes a new database file for a new component configuration.

OpenOldSolid opens a file for a tooling solid that has already undergone partial boundary redefinition by removal of one or more path solids during user-interactive machining.

StorePntData is used to store a selected tool path point in the database for processing in the user-interactive machining operation.

Delete_path removes data for the selected path from the database file created in the OpenNewSolid subroutine.

Delete_point removes data for the selected point from the database file created in the OpenNewSolid subroutine.

ExportParasolid converts the resulting tool solid in UG to a Parasolid® model without associated parametric data for downloading.

GenerateArc identifies points that are to be modeled as an arc.

GenerateSpl identifies points that are to be modeled as a B-spline.

Message is a function that displays status information to the user.

RemoveArcSpline allows the user to remove points from a cut that has been assigned for modeling as an arc or a spline.

RemovePlane similarly allows the user to reclassify points on a plane.

RemovePoints interacts with the UniGraphics program to delete points.

WriteDataFile directs transfer of the existing tool path information to a file for subsequent batch processing.

Data Structure

The functions comprising the interactive preprocessing of the method of this invention operate upon the created database using the data structure defined in the header file. This header file defines two structures: a path structure and a point structure in doubly linked lists. This format follows the logical hierarchy used in each book of NC machining instructions. The book comprises a list of path structures and every path structure comprises a list of point structures. Upon completion of the automated preprocessing, the data from the temporary file is read into memory in this same data format.

The header file defines the x, y, and z coordinates of each point on the tool path, as well as the slope of the cutter rotational axis in the x, y, and z coordinate system. The header file also includes data related to each path, such as the classification of the path as either a three-axis or five-axis cut and the sub-classification for each three-axis path as to whether it can be modeled as an arc, planar, B-spline, or linear cut. Each point is also assigned a UG tag for identification within the UG program. Additionally, the sequence of each point within the tool path point series is defined through identification of the previous point in the path and the next succeeding point in the path.

The header file also provides formatting for the path structure, including the sequence number for the particular path within the book as well as the total number of paths in the book. There is also a UG tag for each path. The file also contains an identification of the first and last points comprising the path and the identification of the previous and next paths in the path sequences.

Automated Preprocessing Data File

Upon completion of the automated portion, the preprocessed tool instruction data is stored in a temporary file for reading during interactive preprocessing. The file contains several key words, which are interpreted during interactive preprocessing:

| | |
|---|---|
| TOOL PATH | Lists the number of the paths in the book. |
| AXIS | Shows whether the path is a three or five-axis cut. |
| TLDATA | Data describing the cutting tool geometry. |
| PLAN | Point is part of a planar cut. |
| PLNA | Point is part of an arc in a planar cut. |
| PLNS | Point is part of a B-spline in a planar cut. |
| GOTO | Point is either a three or five-axis cut. |
| SPLN | Point is part of a B-spline. |
| ARCD | Point is part of an arc. |

Automated Preprocessing Programs

The following eight programs control the automated preprocessing:

| | | | |
|---|---|---|---|
| FileFixer | FindArc | FindPlane | MinMax |
| UselessLines | CallSpline | CheckSpline | CheckRadius |

FileFixer controls preprocessing of CLS files by directing six passes through an entire CLS file and writing a new working database file. On pass 1, the program eliminates non-machining paths on the basis of key words and feed rates detected within the instructions (step 22). On this pass, it also identifies each path type as three- or five-axis (step 24) and counts the total number of paths in the file. On pass 2, path point sets that are coplanar are identified for modeling as planar (step 26) segments. On pass 3, arcs (step 26) between path points are calculated to determine if arc modeling can be used. On pass 4, the tool paths are checked for spline (step 26) modeling. On pass 5, the reference coordinate system is established and absolute minimum and maximum points in the x, y, and z axes are calculated (steps 28 and 30). Also on pass 5, tool paths which do not define cutting operations are removed from the data file (step 34). On pass 6 the minimum and maximum coordinate points are written to the top of the file.

FindArc is used on pass 3 to determine whether tool path arcs are within established tolerances.

FindPlane is used on pass 2 to determine whether tool paths can be represented as planar sections by analyzing z-axis translations.

MinMax is used on pass 5 to determine the minimum and maximum coordinates of the cutting paths (step 30). This function also removes tool paths in which no cutting is performed (step 34).

UselessLines counts the total number of tool paths and eliminates tool paths containing commands incorporating the terms PPRINT, PAINT, SPINDL, RAPID, and FEDRAT (step 22). The function also classifies each tool path as three-axis or five-axis (step 24).

CallSpline operates in pass 4 to determine if a tool path curve can be approximated as a spline. It references the arc tolerance function to determine the minimum arc radius allowed.

CheckSpline cycles through the input points and calculates the angle between the two successive vectors generated from successive sets of three points.

CheckRadius calculates the radius of an arc through three given points.

Machining Simulation Programs

This simulation of the machining process utilizes the following fifteen functions:

| | | | |
|---|---|---|---|
| CountArcSplPts | CountCuts | Create3AxPath | CreateArcPath |
| CreateBoundPlane | CreatPathCrv | CreatePlanePath | CreatePocket |
| CreatePoint | CreateSplPath | InteractiveCut | SubtractSolid |
| Create_csys | Create_cutter | Sort_solids | |

FIGS. 11 and 12 depict the hierarchy of the function calls in the simulation programming.

CountArcSplPts determines the number of tool path points that make up the arc or spline as appropriate.

CountCuts determines the number of separately modeled cuts in the selected tool path.

Create3AxPath creates the tool path solid for a three-axis cut.

CreateArcPath creates the tool path solid for an arc cut.

CreateBoundPlane creates the bounded planes $BP_1$ and $BP_2$ to create the model for a planar cut.

CreatPathCrv creates the curves for the visual depiction of the tool path between points in a cut.

CreatePlanePath creates the tool path solid for a planar cut using the CreateBoundPlane subroutine.

CreatePocket creates the tool path solid for machining operations determined by the user to constitute a pocket formation comprising a series of successively deeper planar cuts.

CreatePoint creates the UG entity for visual display of points.

CreateSplPath creates the tool path solid for a spline cut.

InteractiveCut calls the appropriate simulation function for each tool path solid and for subtraction of the accumulated tool path solids from the initial tool solid.

SubtractSolid calls the UniGraphics Boolean function that redefines the tool solid boundaries upon subtraction of the selected tool path solids.

Create_csys creates a coordinate system relative to the cutting tool.

Create_cutter establishes the cutter profile from the cutter geometry data.

Sort_solids designates the particular tool solid segment to be the subject of further processing following any cutting operation that separates the tool solid into two or more portions. This function is accomplished by calculating the centroid of the tool solid prior to the separating cut and the centroids of resulting tool solid portions. The program selects the resulting tool solid portion, the centroid of which is most proximate to centroid of the pre-separation tool solid.

Many changes, modifications, variations, combinations, subcombinations and other uses and applications of the subject invention will be and become apparent to those skilled in the art after considering this specification and the accompanying drawings, which disclose a preferred embodiment thereof. All such changes, modifications, variations, and other uses and applications that do not depart from the spirit and scope of the invention are deemed to be covered by the invention, which is to be limited only by the claims which follow.

What is claimed is:

1. A method of generating a computer-based three-dimensional representation of an object from data containing dimensions of a cutting tool and a plurality of points defining one or more tool paths of that cutting tool, the object resulting from the operation of the cutting tool along the tool paths within an initial tool solid, which operation results in removal of one or more tool path solids from the initial tool solid, the method comprising the steps of:

creating a mathematical model of the initial tool solid from data containing dimensions of a cutting tool and a plurality of points defining one or more tool paths such that the initial tool solid model encompasses the tool paths;

creating a mathematical model of the tool path solid removed along each tool path by defining a modeling tolerance and representing the tool path as the mathematical model if the difference between the points defining the tool path and the points of the mathematical model is less than or equal to the modeling tolerance; and subtracting each tool path solid model from the initial tool solid model;

thereby producing the computer-based three-dimensional representation of the object.

2. The method of claim 1 wherein the step of creating the model of at least one of the tool path solids comprises representing the tool path as one or more geometric figures, thereby creating a representation of the tool path.

3. The method of claim 2 wherein the geometric figures are selected from the group comprising straight line segments, arcs, spline curves, and planar segments.

4. The method of claim 2 wherein the tool path has a first point, a second point, a third point, and a fourth point and the step of representing the tool path as one or more geometric figures comprises:

defining a tolerance for arc modeling;

determining the center point of a first arc defined by the first, second, and third points on the tool path;

determining the center point of a second arc defined by the second, the third and a fourth point on the tool path;

comparing the first arc center point with the second arc center point; and representing the tool path through the first, second, third, and fourth points as an arc if the difference between the center points of the first and second arcs is less than or equal to the arc modeling tolerance.

5. The method of claim 2 wherein the tool path has a first point, a second point, and a third point and the step of representing the tool path as one or more geometric figures comprises:

defining a tolerance for spline modeling;

determining a first vector defined by the first and second points on the tool path;

determining a second vector defined by the second and third points on the tool path;

determining the angle between the first and second vectors; and representing the tool path through the first, second, and third points as a spline if the angle between the first and second vectors is less than or equal to the spline modeling tolerance.

6. The method of claim 5 wherein the step of representing the tool path as one or more geometric figures further comprises:

defining a minimum radius of curvature for spline modeling;

determining the radius of curvature at the first, second, and third points on the tool path; and representing the tool path through the first, second, and third points as a spline if the radius of curvature at the first, second, and third points is greater than or equal to the minimum radius of curvature.

7. The method of claim 2 wherein the tool path has a first point, a second point, a third point, and a fourth point and the step of representing the tool path as one or more geometric figures comprises:

defining a tolerance for plane modeling;

determining the plane defined by the first, second, and third points on the tool path;

determining the distance between the plane and the fourth point on the tool path; and representing the tool path through the first, second, third, and fourth points as a plane if the distance between the plane and the fourth point is less than or equal to the plane modeling tolerance.

8. The method of claim 2 wherein the tool path has a first point, a second point, a third point, and a fourth point and the step of representing the tool path as one or more geometric figures comprises:

defining tolerances for arc, spline, and plane modeling;

determining the center point of a first arc defined by the first, second, and third points on the tool path;

determining the center point of a second arc defined by the second, the third and a fourth point on the tool path;

comparing the first arc center point with the second arc center point;

representing the tool path through the first, second, third, and fourth points as an arc if the difference between the center points of the first and second arcs is less than or equal to the arc modeling tolerance;

determining a first vector defined by the first and second points on the tool path;

determining a second vector defined by the second and third points on the tool path determining the angle between the first and second vectors; and representing the tool path through the first, second, and third points as a spline if the angle between the first and second vectors is less than or equal to the spline modeling tolerance;

determining the plane defined by the first, second, and third points on the tool path;

determining the distance between the plane and the fourth point on the tool path;

representing the tool path through the first, second, third, and fourth points as a plane if the distance between the plane and the fourth point is less than or equal to the plane modeling tolerance; and representing the tool path through the first, second, third, and fourth points as a series of straight line segments between the first and second points, second and third points, and third and fourth points if (1) the difference between the center points of the first and second arcs is greater than the arc modeling tolerance, (2) the angle between the first and second vectors is greater than the spline modeling tolerance, and (3) the distance between the plane and the fourth point is greater than the plane modeling tolerance.

9. The method of claim 8 wherein integrating the two-dimensional geometric figure along the representation of the tool path can be selectively reviewed and controlled.

10. The method of claim 2 wherein the step of creating a model of the tool path solid comprises representing the profile of the cutting tool as a two-dimensional geometric figure that is integrated along the representation of the tool path.

11. The method of claim 2 wherein the step of representing the tool path as one or more geometric figures can be selectively reviewed and controlled by the user.

12. The method of claim 1 further comprising the step of eliminating portions of the data that do not define dimensions of the cutting tool or the tool path.

13. The method of claim 12 wherein the step of eliminating portions of the data that do not define dimensions of the cutting tool or the tool path comprises eliminating portions of the data that contain predetermined characters.

14. The method of claim 1 wherein each tool path is defined by one or more points in a rectangular coordinate system having three orthogonal axes and wherein the step of creating a model of the initial tool solid comprises:

determining the minimum and maximum values in each of the axes of the coordinate system for the tool path points; and constructing a model of the geometric solid bounded by the six planes defined by both the minimum and maximum values in each of the axes.

15. A method of generating a computer-based three-dimensional representation of an object from data containing dimensions of an initial tool solid, dimensions of a cutting tool, and a plurality of points defining one or more tool paths, the object resulting from the operation of the cutting tool along the tool paths within the initial tool solid that removes one or more tool path solids from the initial tool solid, the method comprising the steps of:

creating a mathematical model of the initial tool solid;

creating a mathematical model of the tool path solid removed along each tool path by defining a geometric modeling tolerance and representing the tool path as one or more geometric figures if the difference between the points defining the tool path and the points defining the geometric figure is less than or equal to the geometric modeling tolerance; and subtracting each tool path solid model from the initial tool solid model.

16. The method of claim 15 wherein the geometric figures are selected from the group comprising straight line segments, arcs, spline curves, and planar segments.

17. The method of claim 15 wherein the step of representing the tool path as one or more geometric figures comprises:

defining a tolerance for arc modeling;

determining the center point of a first arc defined by the first, second, and third points on the tool path;

determining the center point of a second arc defined by the second, the third and a fourth point on the tool path;

comparing the first arc center point with the second arc center point; and representing the tool path through the first, second, third, and fourth points as an arc if the difference between the center points of the first and second arcs is less than or equal to the arc modeling tolerance.

18. The method of claim 15 wherein the step of representing the tool path as one or more geometric figures comprises:

defining a tolerance for spline modeling;

determining a first vector defined by the first and second points on the tool path;

determining a second vector defined by the second and third points on the tool path;

determining the angle between the first and second vectors; and representing the tool path through the first, second, and third points as a spline if the angle between the first and second vectors is less than or equal to the spline modeling tolerance.

19. The method of claim 15 wherein the step of representing the tool path as one or more geometric figures comprises:

defining a tolerance for plane modeling;

determining the plane defined by the first, second, and third points on the tool path;

determining the distance between the plane and the fourth point on the tool path; and representing the tool path through the first, second, third, and fourth points as a plane if the distance between the plane and the fourth point is less than or equal to the plane modeling tolerance.

20. The method of claim 15 wherein the tool path has a first point, a second point, a third point, and a fourth point and the step of representing the tool path as one or more geometric figures comprises:

defining tolerances for arc, spline, and plane modeling;

determining the center point of a first arc defined by the first, second, and third points on the tool path;

determining the center point of a second arc defined by the second, the third and a fourth point on the tool path;

comparing the first arc center point with the second arc center point;

representing the tool path through the first, second, third, and fourth points as an arc if the difference between the center points of the first and second arcs is less than or equal to the arc modeling tolerance;

determining a first vector defined by the first and second points on the tool path;

determining a second vector defined by the second and third points on the tool path determining the angle between the first and second vectors; and representing the tool path through the first, second, and third points as a spline if the angle between the first and second vectors is less than or equal to the spline modeling tolerance;

determining the plane defined by the first, second, and third points on the tool path;

determining the distance between the plane and the fourth point on the tool path;

representing the tool path through the first, second, third, and fourth points as a plane if the distance between the plane and the fourth point is less than or equal to the plane modeling tolerance; and representing the tool path through the first, second, third, and fourth points as a series of straight line segments between the first and second points, second and third points, and third and fourth points if (1) the difference between the center points of the first and second arcs is greater than the arc modeling tolerance, (2) the angle between the first and second vectors is greater than the spline modeling tolerance, and (3) the distance between the plane and the fourth point is greater than the plane modeling tolerance.

* * * * *